United States Patent Office 3,206,429
Patented Sept. 14, 1965

3,206,429
ANTISTATIC POLYETHYLENE COMPOSITIONS CONTAINING N,N-DIETHANOL OLEAMIDE
Margaret H. Broyles and Roger E. Gibson, Kingsport, Tenn., assignors to Eastman Kodak Company, Rochester, N.Y., a corporation of New Jersey
No Drawing. Filed May 17, 1961, Ser. No. 110,650
6 Claims. (Cl. 260—45.9)

This invention relates to polyethylene compositions of improved properties. More particularly, this invention relates to polyethylene compositions having improved antistatic properties. In a specific aspect, this invention relates to the substantial elimination of electrostatic charges in polyethylene compositions normally tending to generate such charges by incorporating N,N-diethanol oleamide into such compositions.

It has been known for some time that ethylene can be polymerized under suitable conditions to form ethylene polymers that can be used to form a variety of objects. However, one of the undesirable drawbacks of such objects, and particularly thin film of polyethylene, is their tendency to accumulate and retain electrostatic charges. This undesirable property causes oppositely charged particles of dust and lint to collect on polyethylene film in which a charge has accumulated. It also makes difficult the separation of one film sheet from another, as friction resulting from attempted separation of such sheets generates enough of a charge, of opposite polarity in the opposed surfaces, to cause those surfaces to adhere to one another. It is apparent, therefore, that when polyethylene is to be employed in many of its known uses elimination of electrostatic charges on polyethylene film must be substantially eliminated.

Accordingly, it is an object of this invention to provide polyethylene compositions in which the tendency to accumulate or to retain charges of static electricity is substantially eliminated.

Another object of this invention is to provide polyethylene compositions exhibiting a substantially reduced tendency to accumulate and retain electrostatic charges without adversely affecting the properties of the polyethylene compositions such as transparency, haze, color and the like.

Still another object of this invention is to provide improved polyethylene compositions containing N,N-diethanol oleamide which compositions exhibit improved antistatic properties.

Other objects of this invention will be apparent from the detailed description appearing hereinbelow.

The above objects of this invention are accomplished by providing a plastic composition comprising normally solid, high molecular weight polyethylene and a small amount of N,N-diethanol oleamide. The compositions of this invention can be used to prepare polyethylene articles in the form of films, sheets, tubes, coatings and other structural forms where substantial freedom from tendency to acquire or retain static electric charges are desirable.

The compositions of this invention can be prepared by any method suitable for ensuring a uniform mixture of the polymer and the additive in the final product. N,N-diethanol oleamide, since it is readily soluble in amounts of 15% in isopropanol, can be dissolved in this or other suitable solvent and externally coated onto polyethylene pellets by thoroughly mixing the pellets and solution in any suitable tumbling or stirring type mixer. The coated pellets are then formed, by any of the conventional methods, into molded objects or film exhibiting the desired antistatic properties. In general, the amount of N,N-diethanol oleamide used in the plastic polyethylene composition to achieve the desired results is within the range of about .05 about .2% with percentages within the range of about .1 to about .2% being preferred. The larger amounts of N,N-diethanol oleamide will provide the greater reduction in static pickup. It is, of course, possible to use amounts in excess of .2%, but no particular advantages are derived from such use.

The chief advantage of the polyethylene compositions containing N,N-diethanol oleamide is that these compositions allow the production of transparent polyethylene films, tubes and other shaped articles having substantially no tendency to accumulate and retain electrostatic charges. Another significant feature of the plastic compositions of this invention is that they exhibit a reduced tendency toward static pickup without adversely altering other desirable physical properties of the polyethylene. For example, the polyethylene compositions of this invention, even after 96 hours of exposure in 70 parts ozone per 100 million parts of air exhibits no apparent discoloration.

Although the compositions of this invention are composed essentially of normally solid polyethylene and small amounts of N,N-diethanol oleamide, the compositions can also contain small amounts of other desirable additives such as high melting waxes, antioxidants, dyes and pigments for coloring the polyethylene, lubricants, antiblocking or slip agents, as well as other antistatic agents, provided the additional ingredients are not present in a sufficient amount to adversely alter the desirable properties of the polyethylene compositions.

The antistatic properties of any normally solid polyethylene can be improved in accordance with this invention, including low, medium and high density polyethylene. In general, however, the density of the polyethylene can be within the range of about 0.91 to about 0.96 with the preferred polymers having a density within range of about 0.91 to about 0.935. The polyethylene compositions improved with N,N-diethanol oleamide in accordance with the invention are normally solid resins and generally have average molecular weights of at least 10,000 and usually at least 15,000 as distinguished from lower molecular weight waxes. The molecular weight of these ethylene polymers can be determined by measuring the viscosity of a dilute solution of the polymers by a method similar to that of J. Harris, J. Polymer Science, volume 8, page 353 (1952).

The N,N-diethanol oleamide antistatic agent employed in the invention can be conveniently prepared by reacting, at elevated temperature, diethanol amine with an equal molar proportion, or slight excess, of oleic acid as illustrated by Example 1 which follows.

This invention can be further illustrated by the following examples of preferred embodiments thereof although it will be understood that these examples are included merely for purposes of illustration and are not intended to limit the scope of the invention unless otherwise specifically indicated:

EXAMPLE 1

As already indicated, N,N-diethanol oleamide can be prepared by reacting, at elevated temperature, diethanol amine with an equal molar proportion, or slight excess, of oleic acid. To illustrate, a 5 l. three-necked flask equipped with a mechanical stirrer, thermometer, dropping funnel and automatic decanting reflux condenser is charged with 1 l. of a straight petroleum aliphatic solvent (available commercially under the proprietary designation "Varsol") and 525 g. (5 moles) of diethanol amine. The mixture is vigorously stirred while adding 1,438 g. (5 moles+2% excess) of oleic acid. The temperature is raised to 145° C., whereby the water of reaction is evolved, and the reaction is completed by raising the temperature to 164° C.

The solvent is stripped from the reaction product under vacuum at 130° C. The reaction product, while the temperature is at 130° C., is treated with 100 g. of activated carbon. The resulting product is light brown to red in color and its infrared spectrum shows a strong methylene chain absorption at 13.8μ, a strong OH absorption band at 2.86μ, a strong carbonyl band at 6.85μ and a strong C=C band at 6.05μ.

*Analysis.*—Calcd. for

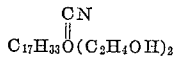

C, 71.5%; H, 11.6%; O, 13.2%; N, 3.7%; OH, 9.2%. Found: C, 71.66%; H, 11.67%; O, 12.71%; N, 3.96%; OH, 9.4%.

EXAMPLE 2

To illustrate the effectiveness of N,N-diethanol oleamide as an antistatic agent in polyethylene compositions it is incorporated into polyethylene having an average molecular weight of about 19,800 and a density of about 0.923. A 1% solution of N,N-diethanol oleamide in isopropyl alcohol is prepared and coated on the surface of the pellets of the polyethylene. The isopropyl alcohol is removed by drying in a circulating air oven at about 50° C. and the coated polyethylene pellets are extruded at a temperature of 320° F. into tubular films approximately 1.5 mils in thickness. The reduction in static pickup of a sample of the film containing 0.1% of N,N-diethanol oleamide is compared with a sample of the same polyethylene film containing no antistatic agent and one containing a known prior art antistatic agent, i.e. polyethylene glycol having an average molecular weight of 400. The results of the comparison are set forth in the table below.

In determining antistatic activity, a section of film is rubbed, with medium pressure, ten strokes with a piece of nylon cloth. Fifteen seconds after the last stroke the film is placed over a dish containing cigarette ashes and the amount of ashes which the rubbed surface picks up and holds is observed. The distance from the film to the ashes is 0.5 inch. The antistatic activity of the film is rated from 0, for no ash pickup, to 4, for maximum pickup.

*Table I*

| Antistatic Agent | Percent | Static Ash Pickup |
|---|---|---|
| None | | 3-4 |
| N,N-diethanol oleamide | 0.1 | 0 |
| Polyethylene Glycol | 0.1 | 3 |

From an examination of the above data, it is obvious that N,N-diethanol oleamide is an effective antistatic agent for polyethylene.

Thus, by the practice of this invention, there is provided polyethylene compositions exhibiting substantially no static pickup. These compositions are useful in packaging materials or for extrusion into thin films, sheets, tubes and the like. The invention is particularly applicable to polyethylene which can be cast or molded into sheets, rods, tubes and other shaped articles. Other uses for the compositions of this invention are for coating paper, cloth, wire, metal foil, glass fibers, synthetic and natural textiles and other substrates.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A plastic composition consisting essentially of normally solid polyethylene and about .05 to about .2% by weight, based on the polyethylene, of N,N-diethanol oleamide.
2. A plastic composition consisting essentially of normally solid polyethylene and about .1 to about .2% by weight, based on the polyethylene, of N,N-diethanol oleamide.
3. A plastic composition consisting essentially of normally solid polyethylene and .1% by weight, based on the polyethylene, of N,N-diethanol oleamide.
4. A plastic film consisting essentially of normally solid polyethylene and about .05 to about .2% by weight, based on the polyethylene, of N,N-diethanol oleamide.
5. A plastic film consisting essentially of normally solid polyethylene and about .1 to about .2% by weight, based on the polyethylene, of N,N-diethanol oleamide.
6. A plastic film consisting essentially of normally solid polyethylene and about .1% by weight, based on the polyethylene, of N,N-diethanol oleamide.

References Cited by the Examiner

UNITED STATES PATENTS

| | | | |
|---|---|---|---|
| 2,640,817 | 6/53 | Sheridan et al. | |
| 2,938,879 | 5/60 | Mack et al. | 260—45.9 |
| 2,956,979 | 10/60 | Rowland et al. | 260—32.6 |
| 2,991,265 | 7/61 | Clarke et al. | 260—45.9 |
| 3,013,997 | 12/61 | Coler et al. | 260—45.9 |

OTHER REFERENCES

Hayek: American Dyestuff Reporter, June 7, 1954, pp. 368–371.

LEON J. BERCOVITZ, *Primary Examiner.*

MILTON STERMAN, *Examiner.*

UNITED STATES PATENT OFFICE
CERTIFICATE OF CORRECTION

Patent No. 3,206,429                 September 14, 1965

Margaret H. Broyles et al.

It is hereby certified that error appears in the above numbered patent requiring correction and that the said Letters Patent should read as corrected below.

Column 3, lines 8 to 10, the formula should appear as shown below instead of as in the patent:

$$C_{17}H_{33}\overset{\overset{\displaystyle O}{\|}}{C}N(C_2H_4OH)_2$$

Signed and sealed this 3rd day of May 1966.

(SEAL)
Attest:

ERNEST W. SWIDER                 EDWARD J. BRENNER
Attesting Officer                 Commissioner of Patents